United States Patent
Kawashima

(10) Patent No.: US 9,665,085 B2
(45) Date of Patent: May 30, 2017

(54) CUTTING CONDITION AND TOOL LIFE DISPLAY DEVICE FOR A NUMERICAL CONTROLLER

(71) Applicant: FANUC Corporation, Yamanashi (JP)

(72) Inventor: Yuusuke Kawashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 315 days.

(21) Appl. No.: 14/221,247

(22) Filed: Mar. 20, 2014

(65) Prior Publication Data
US 2014/0288692 A1    Sep. 25, 2014

(30) Foreign Application Priority Data

Mar. 21, 2013   (JP) .................................. 2013-058938

(51) Int. Cl.
G05B 19/4093    (2006.01)

(52) U.S. Cl.
CPC .................. G05B 19/40937 (2013.01); *G05B 2219/35252* (2013.01); *G05B 2219/36283* (2013.01); *G05B 2219/36284* (2013.01); *Y02P 90/265* (2015.11)

(58) Field of Classification Search
None
See application file for complete search history.

(56) References Cited

U.S. PATENT DOCUMENTS

| | | | | |
|---|---|---|---|---|
| 6,107,768 A | * | 8/2000 | Ouchi | G05B 19/4068 318/568.1 |
| 2005/0038552 A1 | * | 2/2005 | Sagawa | G05B 19/4093 700/181 |
| 2008/0161959 A1 | | 7/2008 | Jerard et al. | |
| 2012/0007536 A1 | * | 1/2012 | Iwashita | G05B 19/4069 318/573 |

FOREIGN PATENT DOCUMENTS

| | | |
|---|---|---|
| CN | 102179728 A | 9/2011 |
| CN | 102765010 A | 11/2012 |
| JP | 622777 B2 | 3/1994 |
| JP | 7-160317 A | 6/1995 |

(Continued)

OTHER PUBLICATIONS

Office Action dated Sep. 22, 2015, corresponding to Chinese Patent Application No. 201410105906.X.

(Continued)

*Primary Examiner* — Mohammad Ali
*Assistant Examiner* — Saad M Kabir
(74) *Attorney, Agent, or Firm* — Hauptman Ham, LLP

(57) ABSTRACT

A numerical controller controls a spindle and/or a movable axis of a finishing machine based on a machining program. A cutting condition display device configured to display a cutting condition for the numerical controller calculates cutting conditions including a cutting speed, a feed per spindle revolution per cutting edge of a tool, and a depth of cut for each fixed time during an operation of the finishing machine, based on any or a combination of data on the spindle, the movable axis, a cutting tool, and an object to be (Continued)

cut, which are held by the numerical controller. The calculated cutting condition is stored for each tool and displayed in a graph.

12 Claims, 11 Drawing Sheets

(56) References Cited

FOREIGN PATENT DOCUMENTS

| JP | 2002116806 A | 4/2002 |
|----|--------------|--------|
| JP | 2002196807 A | 7/2002 |
| JP | 2008134813 A | 6/2008 |
| JP | 2009116745 A | 5/2009 |
| JP | 2013-27944 A | 2/2013 |

OTHER PUBLICATIONS

Office Action mailed Sep. 2, 2014, corresponding to Japanese patent application No. 2013-058938.

* cited by examiner

DIRECTION OF FAST-FORWARD PATH

DIRECTION OF CUTTING-FEED PATH

CUTTING CONDITION AND TOOL LIFE DISPLAY DEVICE FOR A NUMERICAL CONTROLLER

RELATED APPLICATIONS

The present application claims priority to Japanese Application Number 2013-058938, filed Mar. 21, 2013, the disclosure of which is hereby incorporated by reference herein in its entirety.

BACKGROUND OF THE INVENTION

Field of the Invention

The present invention relates to a cutting condition display device configured to display cutting conditions obtained during actual machining or machining simulation.

Description of the Related Art

In conventional machining (e.g., Japanese Patent Application Laid-Open No. 07-160317), cutting conditions that shorten the life of a tool, among other cutting conditions that greatly affect the tool life, are known to be estimated from the tool wear state and past experiences. These influential cutting conditions include the cutting speed, feed per spindle revolution per cutting edge of a tool, depth of cut, spindle speed, and feed speed.

During an operation or machining simulation, those cutting conditions which have too much or too little influence on the trend of the cutting conditions for each machining program and the tool life can be visually searched from graphic display of the influential cutting conditions acquired for each fixed time or each predetermined block of the machining program.

According to the conventional method described above, the cutting conditions that shorten the tool life are searched by estimating the main cause of wear from the tool wear state. However, this method cannot be easily achieved without experience.

SUMMARY OF THE INVENTION

Accordingly, in view of the problem of the prior art described above, the object of the present invention is to provide a cutting condition display device capable of facilitating estimation of cutting conditions that shorten the life of a tool, in order to improve the durability of the tool.

A first aspect of a cutting condition display device configured to display a cutting condition according to the present invention serves for a numerical controller, which controls a spindle and/or a movable axis of a finishing machine based on a machining program. The cutting condition display device comprises a cutting condition calculation unit configured to calculate at least one of cutting conditions including a cutting speed, a feed per spindle revolution per cutting edge of a tool, and a depth of cut for each fixed time or each predetermined block of the machining program during an operation of the finishing machine, based on any or a combination of data on the spindle, the movable axis, a cutting tool, and an object to be cut, which are held by the numerical controller, a cutting condition storage unit configured to store the calculated cutting condition for each tool, and a graphic display unit configured to graphically display the cutting condition stored in the cutting condition storage unit.

The cutting condition display device may further comprise a cutting condition acquisition unit configured to acquire at least one of cutting conditions including a spindle speed and a feed speed for each fixed time or each predetermined block of the machining program, during the operation of the finishing machine, based on any of data on the spindle and the movable axis. The cutting condition storage unit may be configured to store, for each tool, the cutting condition acquired by the cutting condition acquisition unit.

A second aspect of the cutting condition display device configured to display a cutting condition according to the present invention serves for a machining simulation device, which controls a spindle and/or a movable axis based on a machining program. The cutting condition display device comprises a cutting condition calculation unit configured to calculate at least one of cutting conditions including a cutting speed, a feed per spindle revolution per cutting edge of a tool, and a depth of cut for each fixed time or each predetermined block of the machining program during a machining simulation, based on any or a combination of a command given to the spindle by the machining program, a command given to the movable axis by the machining program, and data on a cutting tool and an object to be cut, a cutting condition storage unit configured to store the calculated cutting condition for each tool, and a graphic display unit configured to graphically display the cutting condition stored in the cutting condition storage unit.

The cutting condition display device may further comprise a cutting condition acquisition unit configured to acquire at least one of cutting conditions including a spindle speed and a feed speed for each fixed time or each predetermined block of the machining program, during the machining simulation, based on the command given to the spindle or the command given to the movable axis. The cutting condition storage unit may be configured to store, for each tool, the cutting condition acquired by the cutting condition acquisition unit.

In either of the cutting condition display devices for the numerical controller and the machining simulation device described above, the graphic display unit may be configured to display a graph created by plotting the cutting condition stored on a coordinate system with coordinate axes representative of the cutting condition by the cutting condition storage unit and the value of the cutting condition corresponding to the plotted point.

Either of the cutting condition display devices for the numerical controller and the machining simulation device described above may further comprise a block number acquisition unit configured to acquire the machining program and a block number when the cutting condition is calculated and a machining program display unit configured to display the machining program. The graphic display unit may be configured to display a graph created by plotting the cutting condition stored on a coordinate system with coordinate axes representative of the cutting condition by the cutting condition storage unit, the cutting condition storage unit may be configured to store the calculated or acquired cutting condition in association with the machining program and the block number acquired by the block number acquisition unit, and a cursor may be configured to move to a block stored in the associated manner in the machining program display unit when a point plotted on the graph is selected in the graphic display unit.

Either of the cutting condition display devices for the numerical controller and the machining simulation device described above may further comprise a block number acquisition unit configured to acquire the machining program and a block number when the cutting condition is calculated or acquired and a machining program display unit configured to display the machining program. The graphic display unit may be configured to display a graph created by plotting the cutting condition stored on a coordinate system with coordinate axes representative of the cutting condition by the cutting condition storage unit, the cutting condition storage unit may be configured to store the calculated or acquired cutting condition in association with the machining program and the block number acquired by the block number acquisition unit, and a display color or a background color of a block stored in the associated manner in the machining program display unit is changed to a predetermined color when a point plotted on the graph may be selected in the graphic display unit.

Either of the cutting condition display devices for the numerical controller and the machining simulation device described above may further comprise a block number acquisition unit configured to acquire the machining program and a block number when the cutting condition is calculated or acquired. The graphic display unit may be configured to display a graph created by plotting, on a coordinate system with coordinate axes representative of the cutting condition, the cutting condition stored by the cutting condition storage unit, the cutting condition storage unit may be configured to store the calculated or acquired cutting condition in association with the machining program and the block number acquired by the block number acquisition unit, and the machining program and the block number stored in the associated manner may be displayed for each point plotted on the graph by the graphic display unit.

In either of the cutting condition display devices for the numerical controller and the machining simulation device described above, the cutting condition storage unit may be configured to store the calculated or acquired cutting condition when a calculated difference between the cutting condition stored last time and the calculated or acquired cutting condition is not less than a fixed value.

Either of the cutting condition display devices for the numerical controller and the machining simulation device described above may further comprise a block number comparison unit configured to compare the machining program and a block number for the calculation or acquisition of the cutting condition stored last time with those for the calculation or acquisition of the calculated or acquired cutting condition. The cutting condition storage unit may be configured to store the calculated or acquired cutting condition when the machining programs and the block numbers compared by the block number comparison unit are different.

According to the present invention, there can be provided a cutting condition display device capable of facilitating estimation of cutting conditions that shorten the life of a tool, in order to improve the durability of the tool.

BRIEF DESCRIPTION OF THE DRAWINGS

The above and other objects and features of the present invention will be obvious from the ensuing description of embodiments with reference to the accompanying drawings, in which:

FIG. 16 is a flowchart of processing for keeping similar cutting conditions from being stored during actual machining (or during the operation of the finishing machine), in which machining program names, block numbers, and cutting conditions are stored if the cutting conditions are not similar;

DETAILED DESCRIPTION OF THE PREFERRED EMBODIMENTS

Figure 1:
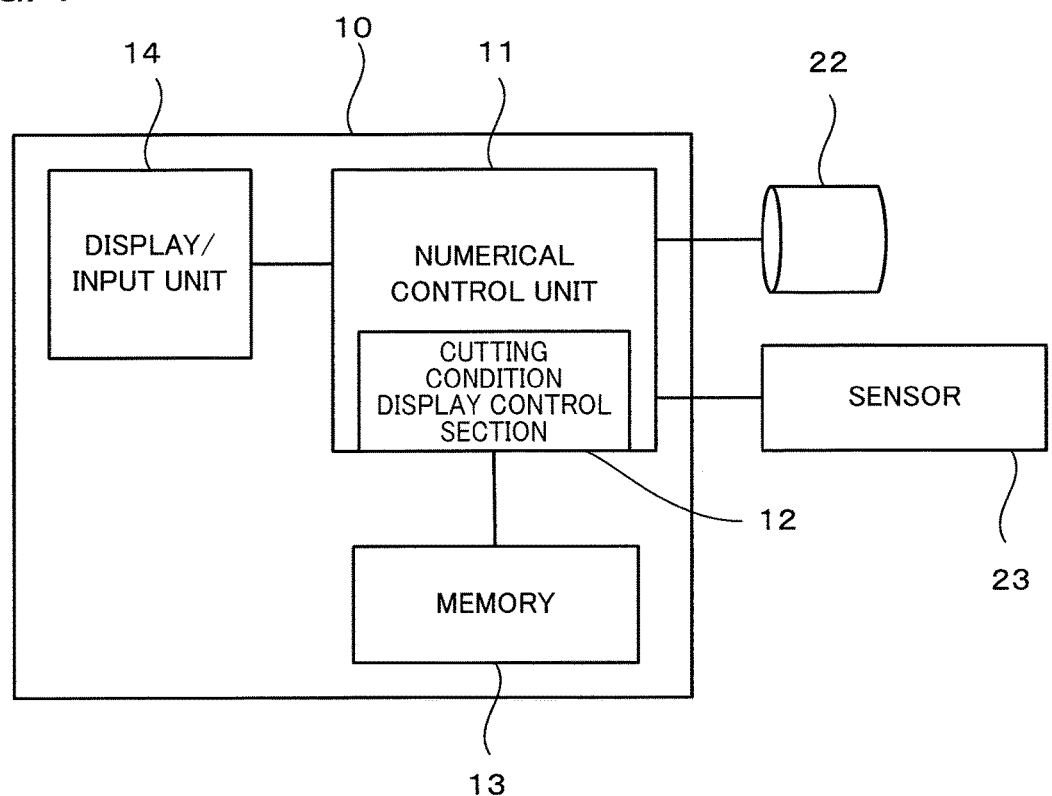
FIG. 1 is a schematic block diagram of a numerical controller for controlling a machine tool.
Figure 2:
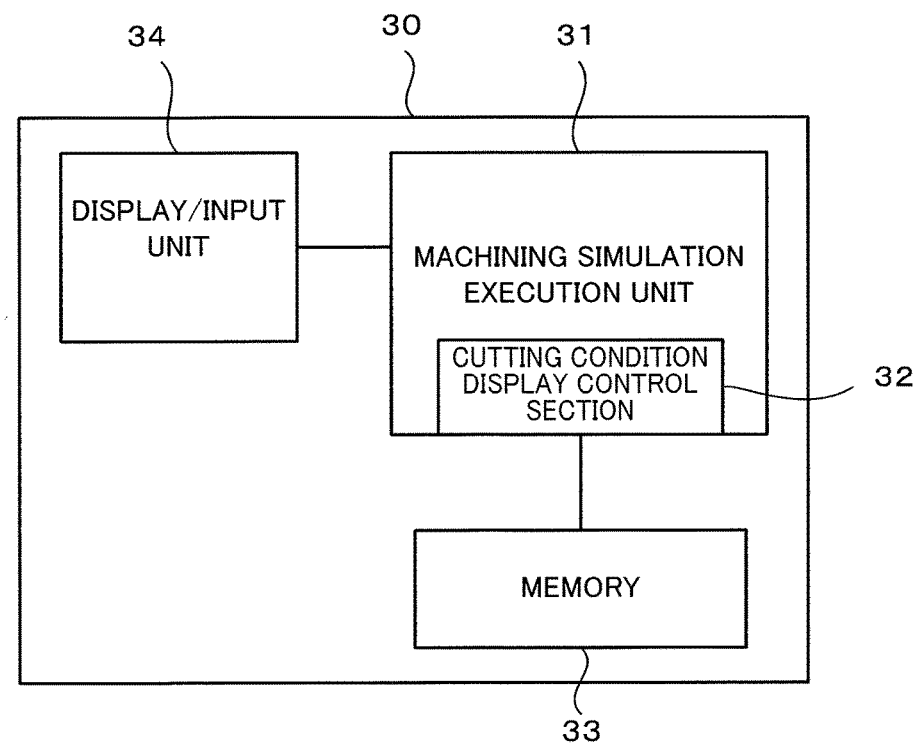
FIG. 2 is a diagram illustrating a schematic configuration of a machining simulation device.

A cutting condition display device according to the present invention is specifically composed of a numerical controller for a finishing machine, such as the one shown in FIG. 1, or a machining simulation device of a numerical controller, such as the one shown in FIG. 2.

FIG. 1 is a schematic block diagram of a numerical controller for controlling a machine tool. A numerical controller 10 is connected with a motor 22, such as a servomotor or spindle motor, which drives each feed axis of the finishing machine or the like and is also connected with a sensor 23 for detecting machining state data, such as load, vibration, etc., related to a tool. The numerical controller 10 comprises a numerical control unit 11, which drivingly controls the spindle motor and the servomotor for each feed axis, based on machining programs or the like stored in a memory 13. The numerical control unit 11 comprises a cutting condition display control section 12 related to the present invention. The numerical controller 10 further comprises a display/input unit 14, which comprises a display section and an input section. The display section is composed of a liquid-crystal display device or the like that displays various data, the machining programs each formed of a plurality of blocks, etc. The input section may be a keyboard or the like through which data and commands are input. While the numerical controller 10 is constructed substantially in the same manner as a conventional numerical controller, it differs from the conventional numerical controller in that the numerical control unit 11 comprises the cutting condition display control section 12 composed of software.

FIG. 2 is a diagram illustrating a schematic configuration of the machining simulation device. A machining simulation device 30 comprises a machining simulation execution unit 31, which simulates machining based on machining programs stored in a memory 33. The machining simulation execution unit 31 comprises a cutting condition display control section 32 related to the present invention. The machining simulation device 30 further comprises a display/input unit 34, which comprises a display section and an input section. The display section is composed of a liquid-crystal display device or the like that displays various data, the machining programs, etc. The input section may be a keyboard or the like through which data and commands are input. While the machining simulation device 30 is constructed substantially in the same manner as a conventional machining simulation device, it differs from the conventional machining simulation device in that the machining simulation execution unit 31 comprises the cutting condition display control section 32 composed of software.

When the finishing machine is controlled by the numerical controller 10 of FIG. 1 to machine an object to be cut, according to the present invention, cutting conditions are calculated by the cutting condition display control section 12, or the machining simulation device 30 of FIG. 2 is operated so that the cutting conditions are calculated by the cutting condition display control section 32 during the execution of a machining simulation. The cutting conditions to be calculated include, for example, the cutting speed, feed rate per spindle revolution per cutting edge of a tool, and depth of cut. The following is a description of methods of calculating these conditions.

<Cutting Speed>

The cutting speed is a relative speed between a cutting tool and the surface of the object to be cut and can be calculated by the following equation (1):

$$V=(\pi \cdot D \cdot N)/1{,}000, \qquad (1)$$

where V is the cutting speed (m/min), D is the diameter (mm) of the object to be cut, and N is the spindle speed (/min).

In the case of milling, the "diameter of the object to be cut" is replaced with the "diameter of the cutting tool".

<Feed Rate (Feed Per Spindle Revolution Per Cutting Edge of a Tool)>

The feed rate can be calculated by the following equation (2):

$$Ft=F/(N \cdot Z), \qquad (2)$$

where Ft is the feed rate (mm/rev), F is the feed speed (mm/min), N is the spindle speed (/min), and Z is the number of cutting edges.

<Depth of Cut>

The depth of cut can be calculated by the following methods 1 and 2.

Figure 3:
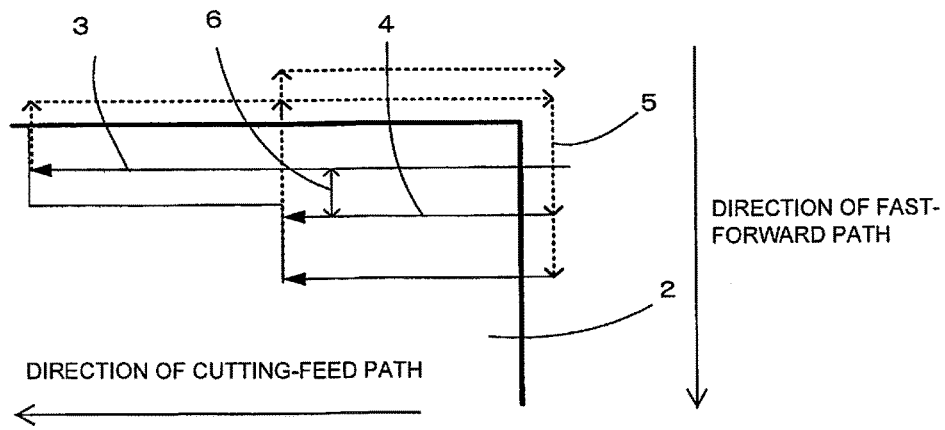
FIG. 3 is a diagram illustrating a screen example that displays a tool trajectory based on a machining simulation.

FIG. 3 is a diagram illustrating a screen example that displays a tool trajectory based on the machining simulation. Numeral 2 denotes the shape (machining shape) of the displayed on the display screen of the cutting condition display device. The tool (not shown) is moved along cutting feed paths denoted by numerals 3 and 4, whereby the machining shape 2 is cut (by actual machining or machining simulation). Numerals 5 and 6 denote a fast-forward path of the tool and the depth of cut, respectively.

The following is a description of the method of calculating the depth of cut, which is one of the cutting conditions.

(Method 1)

(1) Start and end point coordinates for each cutting feed block are stored at the start of the machining programs.

(2) The direction of movement is calculated based on the start and end point coordinates during cutting-feed movement.

(3) Past cutting feed corresponding to the movement direction of step (2) is retrieved from the data stored in step (1).

(4) A distance in the direction perpendicular to the movement direction is calculated and regarded as the depth of cut 6.

(Method 2)

The difference between the shape of the object to be cut and the current position of the tool is calculated, and the value of the calculated difference is regarded as the depth of cut 6. Further, shape information on the object to be cut is updated for each part cut by the tool.

The following is a description of display examples in which the cutting conditions are graphically displayed on the display screen of the cutting condition display device.

Display Example 1

Figure 4:
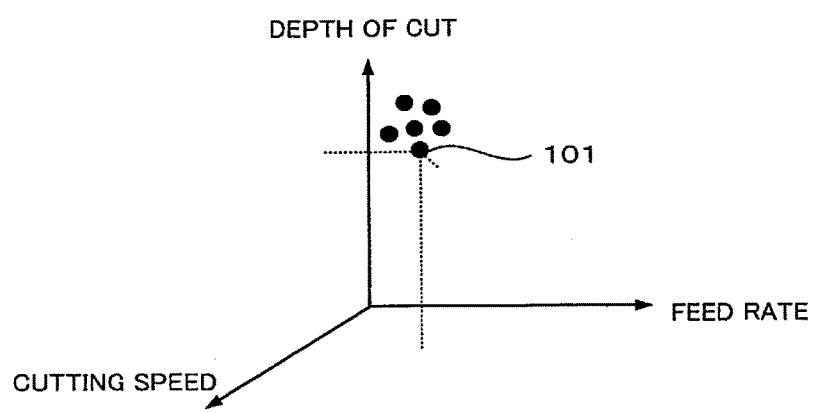
FIG. 4 is a diagram illustrating an example in which cutting conditions of a single machining program are graphically displayed in a scattering diagram.

The following is a description of an example in which the cutting conditions stored in a cutting condition storage section are graphically displayed in a scattering diagram on a three-dimensional coordinate system with its coordinate axes representative of the three cutting conditions (cutting speed, feed rate, and depth of cut). FIG. 4 is a diagram illustrating the example in which the cutting conditions of a single machining program are graphically displayed in the scattering diagram on the three-dimensional coordinate system. The trend of the cutting conditions of the machining program can be confirmed by a group of plotted points. It can be seen at a glance that plots 101 of FIG. 4 tend to be unevenly distributed in the axial direction of the depth of cut. If the cutting conditions of the machining program based on a short tool life are plotted in the manner shown in FIG. 4, only the depth of cut is too great, so that the depth of cut can be estimated to be a cutting condition that shortens the tool life.

Display Example 2

Figure 5:
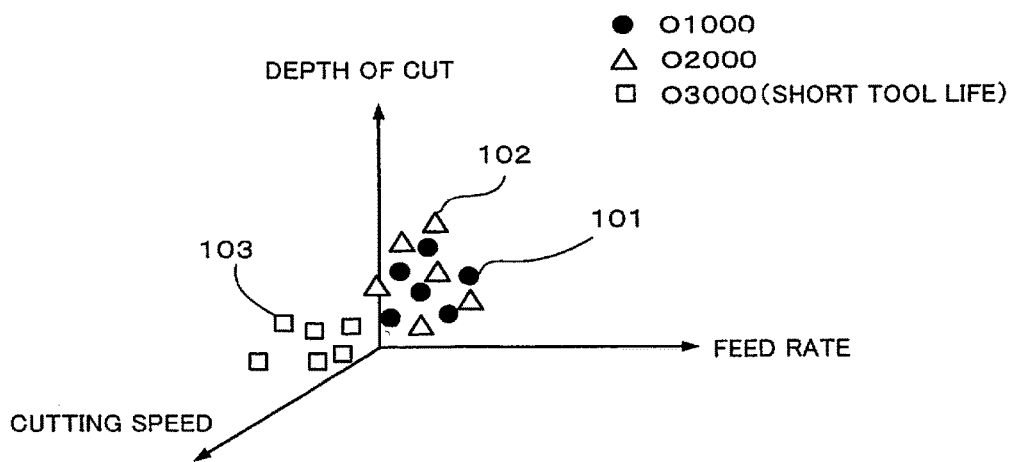
FIG. 5 is a diagram illustrating an example in which cutting conditions of a plurality of machining programs are graphically displayed in a scattering diagram.

The following is a description of an example in which the cutting conditions stored in the cutting condition storage section are graphically displayed in a scattering diagram on the three-dimensional coordinate system with its coordinate axes representative of the three cutting conditions (cutting speed, feed rate, and depth of cut). FIG. 5 is a diagram illustrating the example in which the cutting conditions of a plurality of machining programs are graphically displayed in the scattering diagram on the three-dimensional coordinate system. The cutting conditions are stored for each machining program so that a cutting condition that shortens the tool life can be estimated by comparing the machining programs based on short and long tool lives. When different machining programs are run with the same tool and if a machining program (O3000) that has led to a short tool life and machining programs (O1000 and O2000) that have led to long tool lives are plotted in the manner shown in FIG. 5, the cutting speed of O3000 tends to be relatively high, so that the cutting speed can be estimated to be the cutting condition that shortens the tool life. Numerals 101, 102 and 103 denote plots indicative of the cutting conditions of O1000, O2000 and O3000, respectively.

Display Example 3

Figure 6:
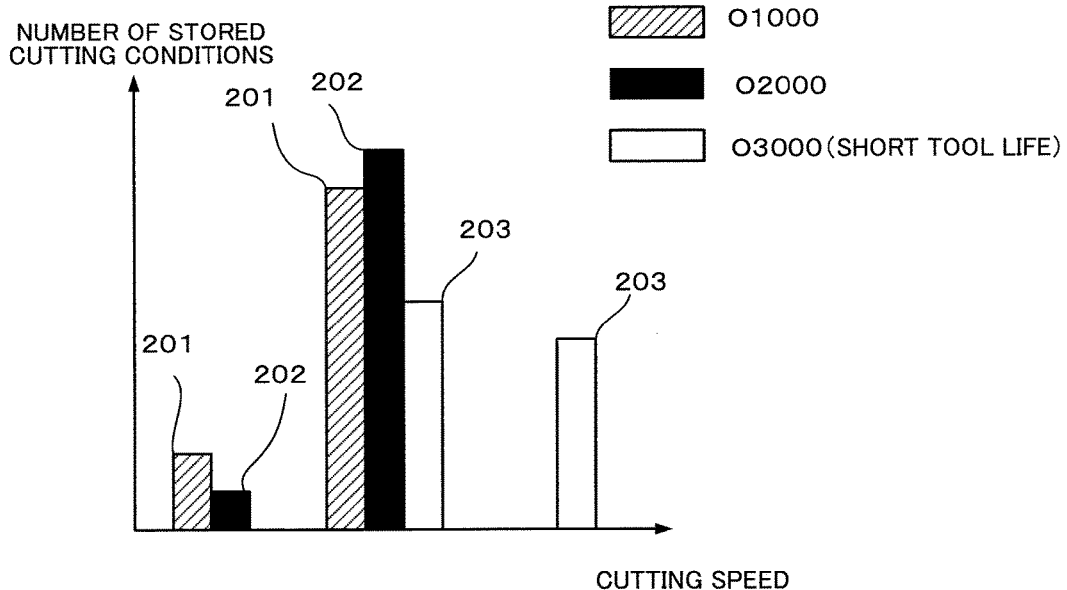
FIG. 6 is a diagram illustrating an example in which cutting conditions of a plurality of machining programs are graphically displayed in a bar graph.

The cutting conditions stored in the cutting condition storage section may be displayed in a bar, circle, or line graph. FIG. 6 is a diagram illustrating an example in which the cutting conditions of a plurality of machining programs are graphically displayed in a bar graph. If the machining program (O3000) that has led to a short tool life and the machining programs (O1000 and O2000) that have led to long tool lives are graphically displayed in the bar graph of FIG. 6, as in the above-described display example 2, the cutting speed of O3000 tends to be relatively high, so that the cutting speed can be estimated to be the cutting condition that shortens the tool life. Numerals 201, 202 and 203 denote the numbers of stored cutting conditions (cutting speeds in FIG. 6) of O1000, O2000 and O3000, respectively.

Display Example 4

Figure 7:
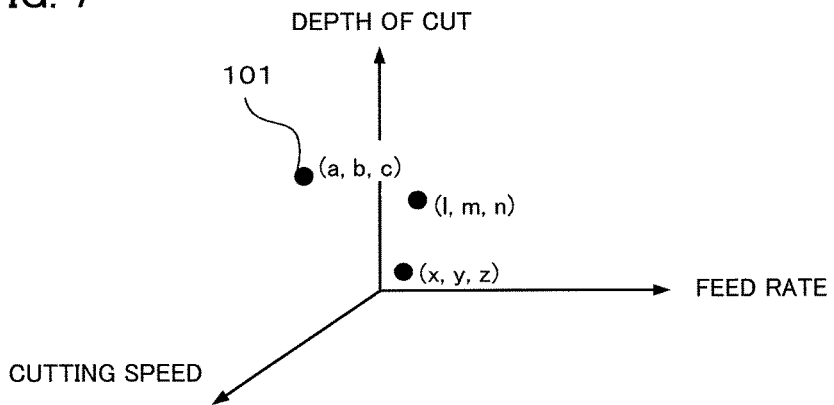
FIG. 7 is a diagram illustrating an example in which specific values of cutting conditions are displayed together on plotted coordinates.

The following is a description of an example in which the cutting conditions stored in the cutting condition storage section are graphically displayed in a scattering diagram on the three-dimensional coordinate system with its coordinate axes representative of the three cutting conditions (cutting speed, feed rate, and depth of cut). FIG. 7 is a diagram illustrating an example in which specific values of the cutting conditions are displayed together with plotted points on plotted coordinates. A cutting condition (e.g., (a, b, c)) is displayed near a plotted display mark 101.

Display Example 5

Figure 8:
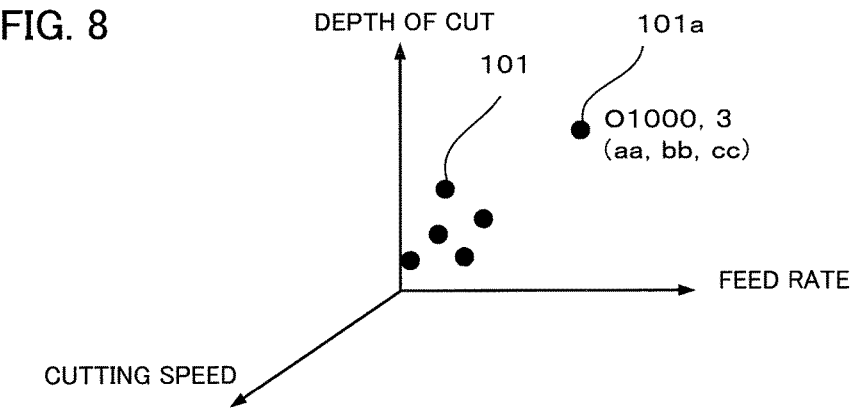
FIG. 8 is a diagram illustrating an example in which specific values of machining program names, block numbers, and cutting conditions are displayed together on plotted coordinates.
Figure 9:
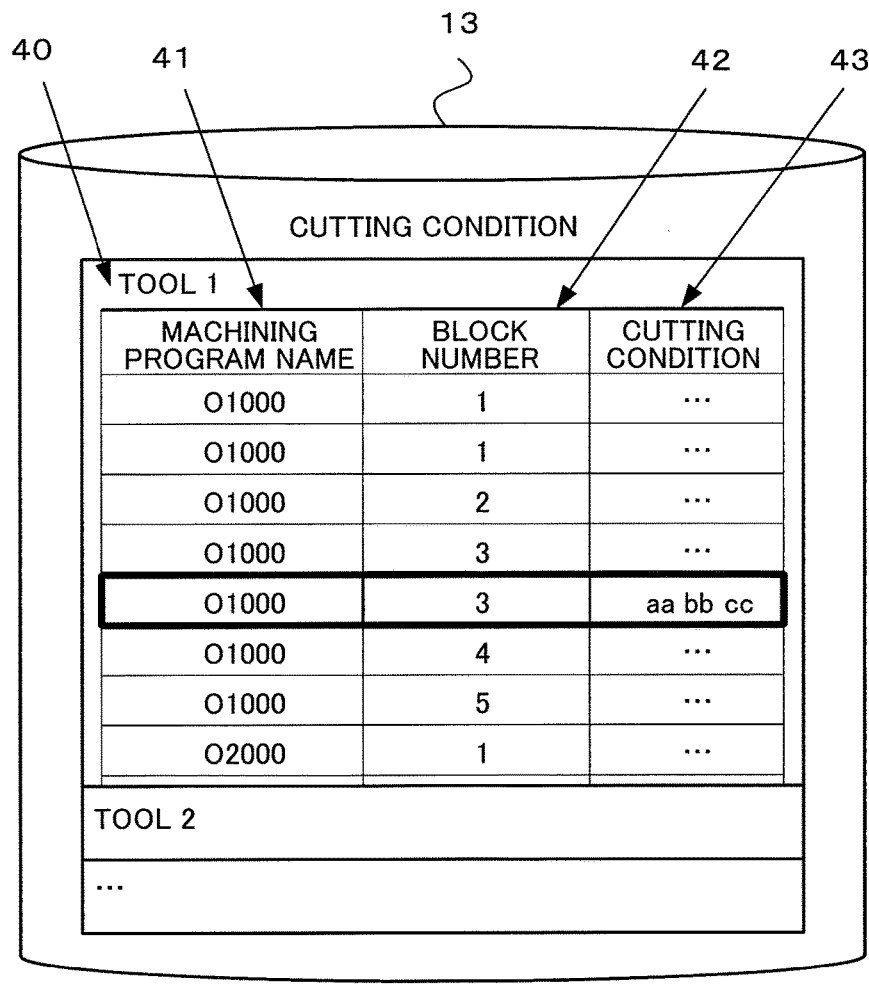
FIG. 9 is a diagram illustrating the cutting conditions stored in a memory.
Figure 10:
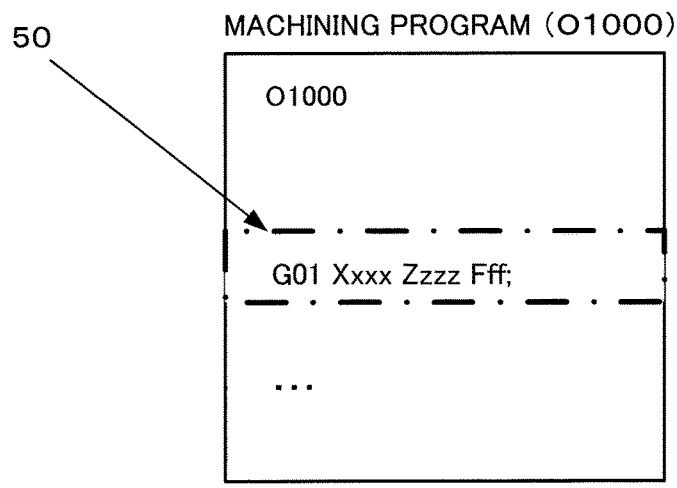
FIG. 10 is a diagram illustrating how a cursor moves to a block of a displayed machining program when a plotted point in a graph is selected.
Figure 11:
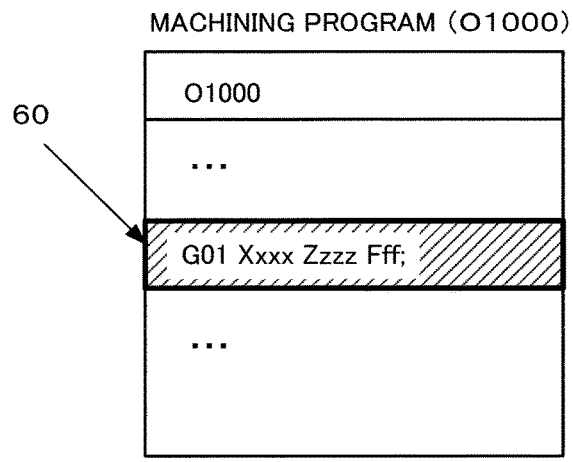
FIG. 11 is a diagram illustrating how the display color of the block of the displayed machining program changes when a plotted point in the graph is selected.

A display example 5 is an example in which contents shown in the plot diagram of FIG. 8 and contents shown in FIG. 10 or 11 are displayed on the display screen of the cutting condition display device. The following is a description of an example in which the cutting conditions stored in the cutting condition storage section are graphically displayed in a scattering diagram on the three-dimensional coordinate system with its coordinate axes representative of the three cutting conditions (cutting speed, feed rate, and depth of cut). FIG. 8 is a diagram illustrating an example in which specific values of machining program names, block numbers, and cutting conditions are displayed together with plotted points on plotted coordinates. FIG. 9 is a diagram illustrating the cutting conditions stored in the memory 13. A file for each tool is stored in the memory 13, as indicated by numeral 40, and machining program names 41, block numbers 42, and cutting conditions 43 are stored in association with each other in the file of a tool 1.

FIG. 10 is a diagram showing a block of the machining program displayed on the screen and illustrating how a cursor 50 moves to the block (selected block) of the displayed machining program when one of the plotted points in the graph is selected. The cutting condition display device has the function of moving the cursor 50 to the selected block when one of the plotted points is selected through the input section by an operator.

FIG. 11 is a diagram showing a block of the machining program displayed on the screen and illustrating how the display color of the block (selected block) of the displayed machining program changes when one of the plotted points in the graph is selected. The cutting condition display device has the function of changing the display or background color of the selected block, as indicated by arrow 60, when one of the plotted points is selected through the input section by the operator.

In the display example 5, the machining program names and the block numbers obtained when the cutting conditions are calculated can be matched based to each other on the points on the graph by being previously stored together with cutting conditions in the memory, as shown in FIG. 9.

Processing for obtaining the cutting conditions of the display examples will now be described with reference to flowcharts.

Figure 12:
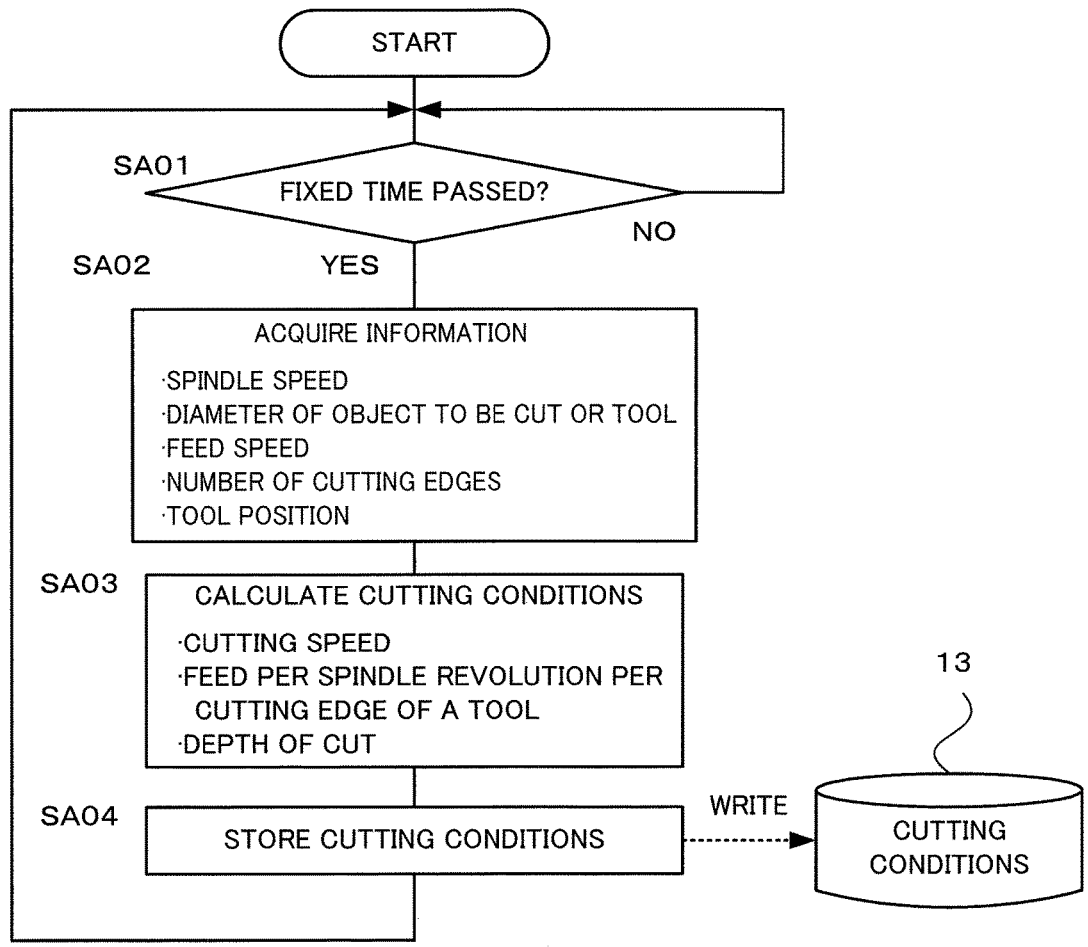
FIG. 12 is a flowchart of processing for obtaining the cutting conditions during machining (or during an operation of a finishing machine)

FIG. 12 is a flowchart of processing for obtaining the cutting conditions during actual machining (or during the operation of the finishing machine). This processing includes a process of calculating necessary cutting conditions for implementing the display examples 1 to 4. The following is a sequential description of steps of this processing. In the processing shown in this flowchart, information of Step SA02 is acquired by sampling with every passage of a fixed time. The start and end of the information acquisition can be matched to those of the machining program.

[Step SA01] Whether or not the fixed time has passed is monitored by timer operation. If the passage of the fixed time is determined, the program proceeds to Step SA02.

[Step SA02] Information is acquired. The information to be acquired includes data, such as the spindle speed, diameter of the object to be cut or the tool, feed speed, number of cutting edges of the tool, and tool position. These data are provided as internal information of a conventional numerical controller, and can be acquired from the numerical control unit 11 of the numerical controller 10 of FIG. 1.

[Step SA03] The cutting conditions are calculated based on the information acquired in Step SA02. The cutting conditions to be calculated include the cutting speed, feed per spindle revolution per cutting edge of a tool, and depth of cut.

[Step SA04] The cutting conditions calculated in Step SA03 are stored (or written) in the memory, whereupon the program returns to Step SA01.

The above flowchart will be additionally explained.

According to the above description, the program is configured to proceed to Step SA02 when the passage of the fixed time is determined in Step SA01. Alternatively, however, the program may be configured to proceed to Step SA02 when the execution of one block of the machining program is finished.

In Step SA02 described above, moreover, the information to be acquired includes the spindle speed, feed speed (relative to the object to be machined) of the tool, tool position, etc., which are data acquired by the numerical controller during the operation of the finishing machine. The diameter of the object to be cut and the number of cutting edges of the tool may be data previously stored in the numerical controller or data to be commanded by the machining program.

Figure 13:
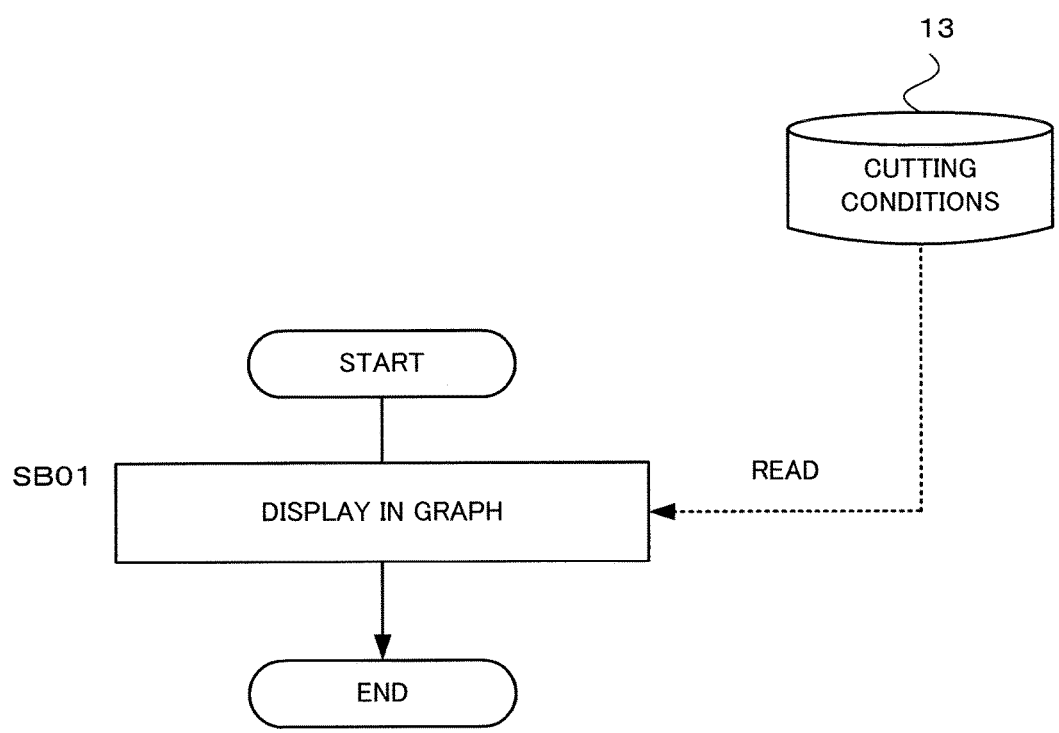
FIG. 13 is a flowchart of processing for graphically displaying the cutting conditions.

FIG. 13 is a flowchart of processing for graphically displaying the cutting conditions.

[Step SB01] The cutting conditions are read from the memory 13 and graphically displayed on the display screen of the cutting condition display device, as shown in FIG. 4, for example. If the cutting condition display device is composed of the numerical controller 10 (FIG. 1) for controlling the finishing machine, the cutting conditions are graphically displayed on the display screen of the display/input unit 14.

Figure 14:
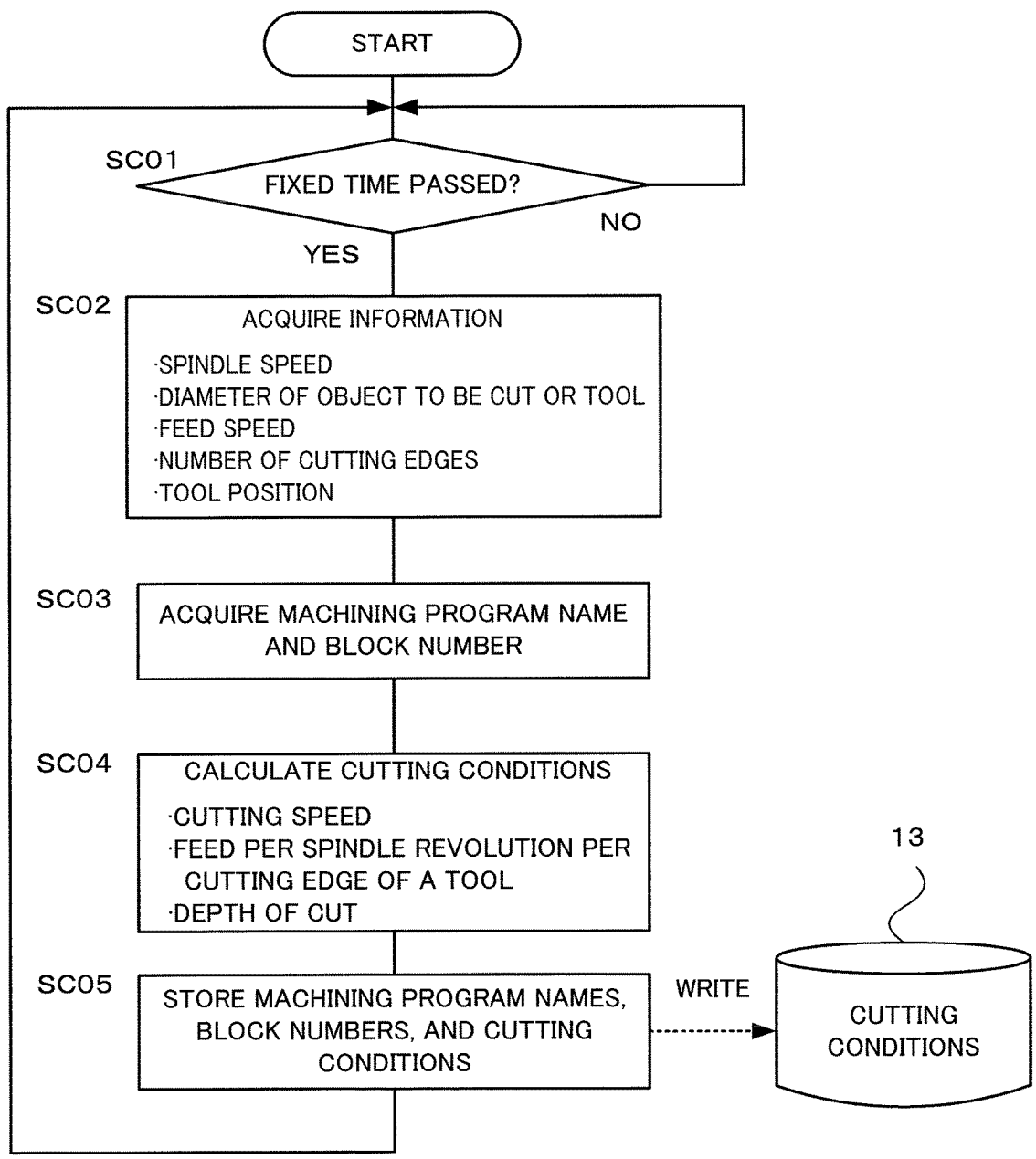
FIG. 14 is a flowchart of processing for acquiring the machining program names and the block numbers during actual machining (or during the operation of the finishing machine)

FIG. 14 is a flowchart of processing for acquiring the machining program names and the block numbers, as well as the cutting conditions. This processing includes processes of calculating necessary cutting conditions for implementing the display example 5 and acquiring the machining programs and the block numbers. The following is a sequential description of steps of this processing.

[Step SC01] Whether or not the fixed time has passed is monitored by timer operation. If the passage of the fixed time is determined, the program proceeds to Step SC02.

[Step SC02] Information is acquired. The information to be acquired includes data, such as the spindle speed, diameter of the object to be cut or the tool, feed speed, number of cutting edges of the tool, and tool position. These data are provided as internal information of a conventional numerical controller, and can be acquired from the numerical control unit 11 of the numerical controller 10 of FIG. 1.

[Step SC03] The machining program and the block number are acquired from the numerical control unit 11 of the numerical controller 10 of FIG. 1.

[Step SC04] The cutting conditions are calculated based on the information acquired in Step SC03. The cutting conditions to be calculated include the cutting speed, feed per spindle revolution per cutting edge of a tool, and depth of cut.

[Step SC05] The cutting conditions calculated in Step SC04 are stored in the memory, in association with the machining program names and the block numbers, whereupon the program returns to Step SC01.

The above flowchart will be additionally explained.

According to the above description, the program is configured to proceed to Step SC02 when the passage of the fixed time is determined in Step SC01. Alternatively, however, the program may be configured to proceed to Step SC02 when the execution of one block of the machining program is finished.

In Step SB01, as shown in FIG. 13, the machining program names, block numbers, and cutting conditions are read from the memory 13 and graphically displayed on the display screen of the cutting condition display device, as shown in FIGS. 5, 6, 7 and 8.

If the cutting conditions that change in a short time are also expected to be stored without omission, the time interval for the calculation of the cutting conditions must be reduced. If this is simply done, however, the stored data volume inevitably increases. Accordingly, similar cutting conditions are kept from being stored so that the stored data volume cannot be excessive even though the time interval for the calculation of the cutting conditions is reduced.

Figure 15:
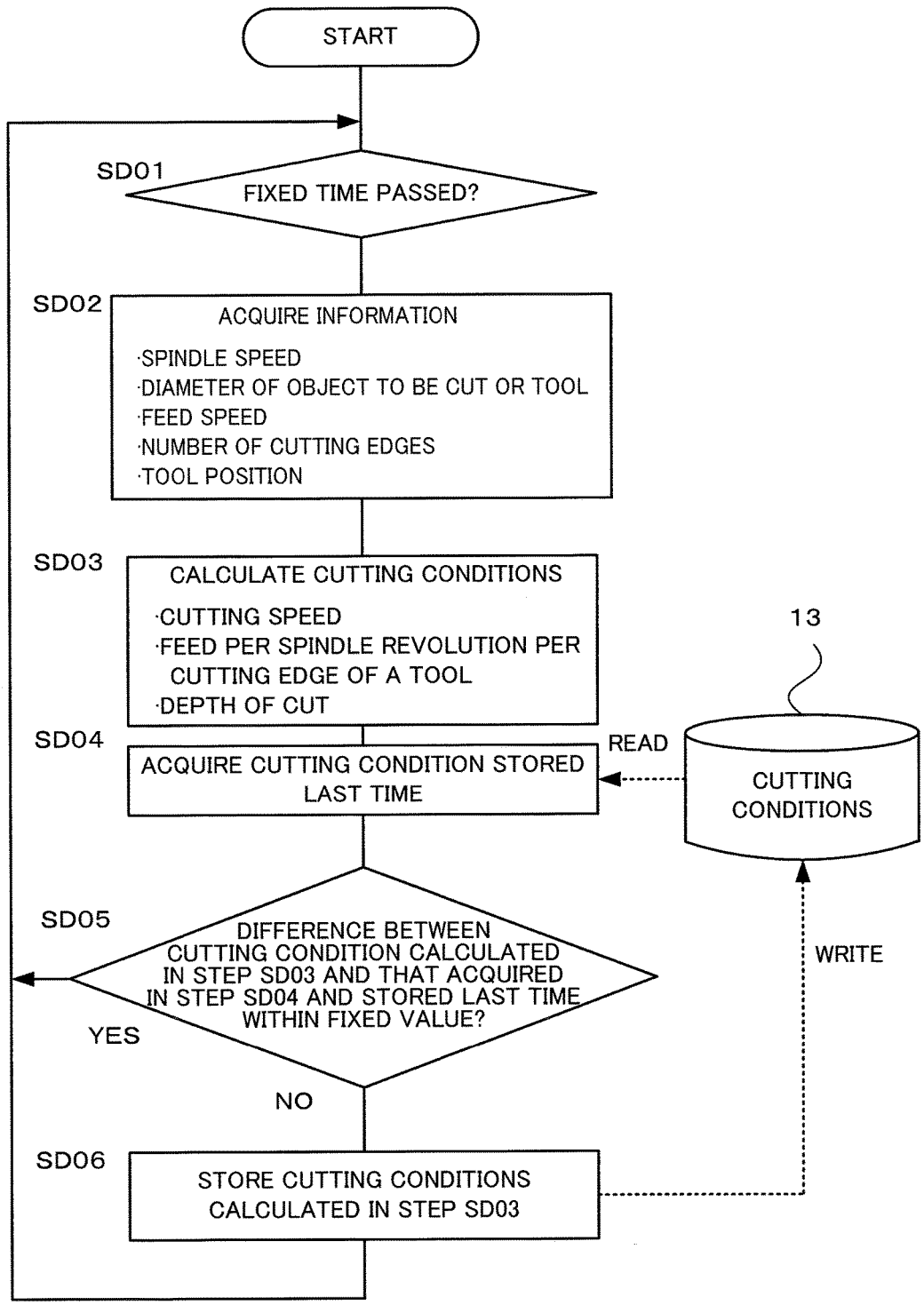
FIG. 15 is a flowchart of processing for keeping similar cutting conditions from being stored during actual machining (or during the operation of the finishing machine)

FIG. 15 is a flowchart of processing for keeping similar cutting conditions from being stored during actual machining (or during the operation of the finishing machine). In the processing shown in this flowchart, no cutting conditions are stored if the difference between a cutting condition stored last time and that stored this time is small. The following is a sequential description of steps of this processing.

[Step SD01] Whether or not the fixed time has passed is monitored by timer operation. If the passage of the fixed time is determined, the program proceeds to Step SD02.

[Step SD02] Information is acquired. The information to be acquired includes data, such as the spindle speed, diameter of the object to be cut or the tool, feed speed, number of cutting edges of the tool, and tool position. These data are provided as internal information of a conventional numerical controller, and can be acquired from the numerical control unit 11 of the numerical controller 10 of FIG. 1.

[Step SD03] The cutting conditions are calculated based on the information acquired in Step SD02. The cutting conditions to be calculated include the cutting speed, feed amount per cutting edge of the tool during one revolution of the spindle, and depth of cut.

[Step SD04] The cutting condition stored last time is acquired from the memory.

[Step SD05] It is determined whether or not the difference between the cutting condition calculated in Step SD03 and that acquired in Step SD04 and stored last time is within a fixed value. If the difference is within the fixed value (YES), the program returns to Step SD01 without storing the cutting conditions calculated in Step SD03 in the memory. If not (NO), the program proceeds to Step SD06.

[Step SD06] The cutting conditions calculated in Step SD03 are stored, whereupon the program returns to Step SD01.

Then, in Step SB01, as shown in FIG. 13, the stored cutting conditions are read from the memory and graphically displayed on the display screen of the cutting condition display device.

The above flowchart will be additionally explained.

According to the above description, the program is configured to proceed to Step SD02 when the passage of the fixed time is determined in Step SD01. Alternatively, however, the program may be configured to proceed to Step SD02 when the execution of one block of the machining program is finished.

Figure 16:
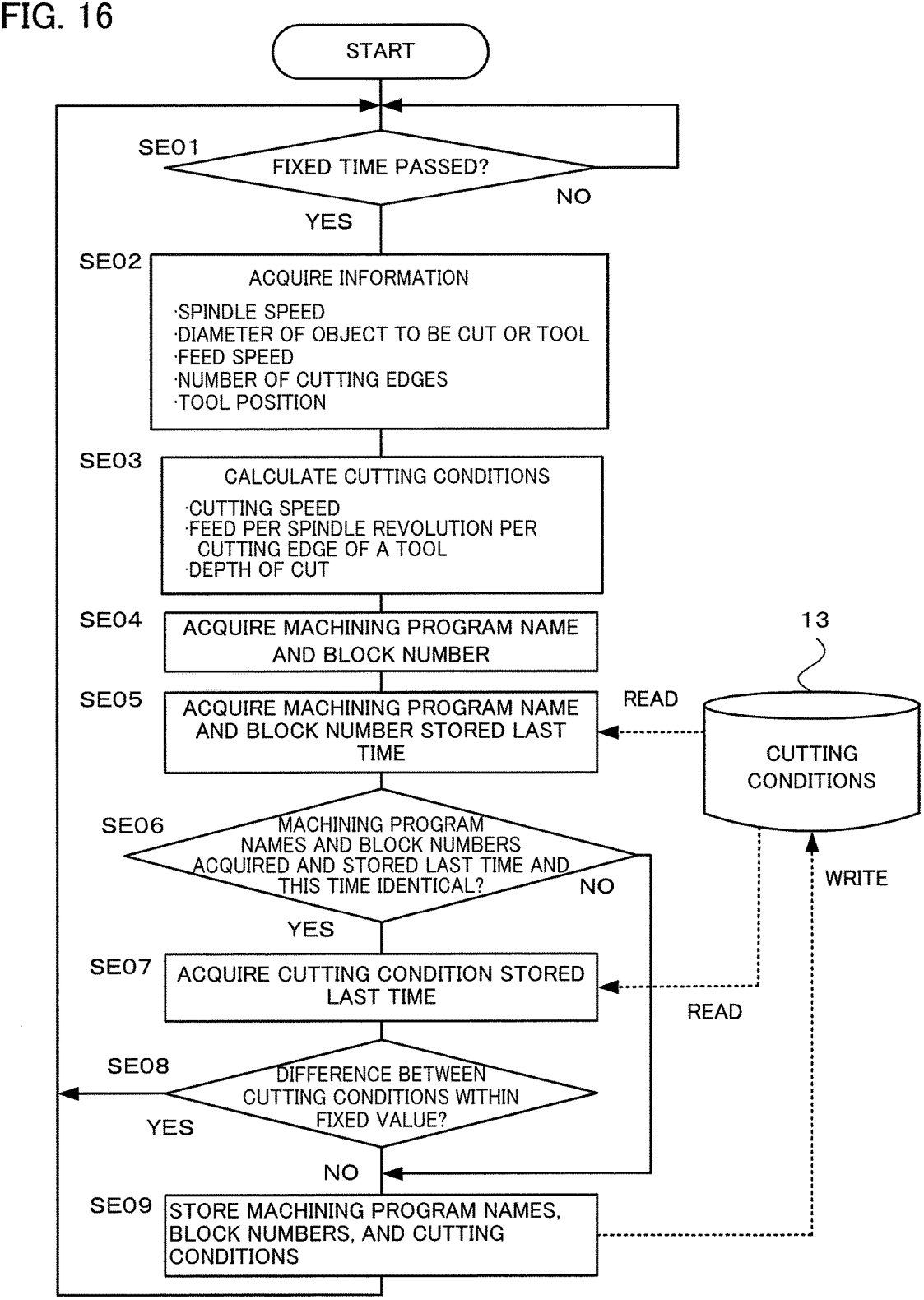

FIG. 16 is a flowchart of processing for keeping similar cutting conditions from being stored during actual machining (or during the operation of the finishing machine). In the processing shown in this flowchart, when the machining program and the block number are identical and if the difference between a cutting condition stored last time and that stored this time is small (or if the cutting conditions are similar), no cutting conditions are stored. If the difference is large (or if the cutting conditions are not similar), however, the machining program names, block numbers, and cutting conditions are stored.

[Step SE01] Whether or not the fixed time has passed is monitored by timer operation. If the passage of the fixed time is determined, the program proceeds to Step SE02.

[Step SE02] Information is acquired. The information to be acquired includes data, such as the spindle speed, diameter of the object to be cut or the tool, feed speed, number of cutting edges of the tool, and tool position. These data are provided as internal information of a conventional numerical controller, and can be acquired from the numerical control unit 11 of the numerical controller 10 of FIG. 1.

[Step SE03] The cutting conditions are calculated based on the information acquired in Step SE02. The cutting conditions to be calculated include the cutting speed, feed per spindle revolution per cutting edge of a tool, and depth of cut.

[Step SE04] The machining program name and the block number are acquired from the numerical control unit 11 of the numerical controller 10 of FIG. 1.

[Step SE05] The machining program name and the block number stored last time are acquired from the memory.

[Step SE06] It is determined whether or not the machining program name and the block number acquired in Step SE4 are identical with those acquired in Step SE05 and stored last time. If the machining program name and the block number stored last time and those stored this time are identical (YES), the program proceeds to Step SE07. If not (NO), the program proceeds to Step SE09.

[Step SE07] The cutting condition stored last time is acquired from the memory.

[Step SE08] It is determined whether or not the difference between the cutting condition calculated in Step SE03 and that acquired in Step SE07 and stored last time is within a fixed value. If the difference is within the fixed value (YES), the program returns to Step SE01. If not (NO), the program proceeds to Step SE09.

[Step SE09] The cutting conditions calculated in Step SE03 are stored (or written) in the memory, in association with the machining program names and the block numbers acquired in Step SE4, whereupon the program returns to Step SE01.

The above flowchart will be additionally explained.

According to the above description, the program is configured to proceed to Step SE02 when the passage of the fixed time is determined in Step SE01. Alternatively, however, the program may be configured to proceed to Step SE02 when the execution of one block of the machining program is finished.

Figure 17:
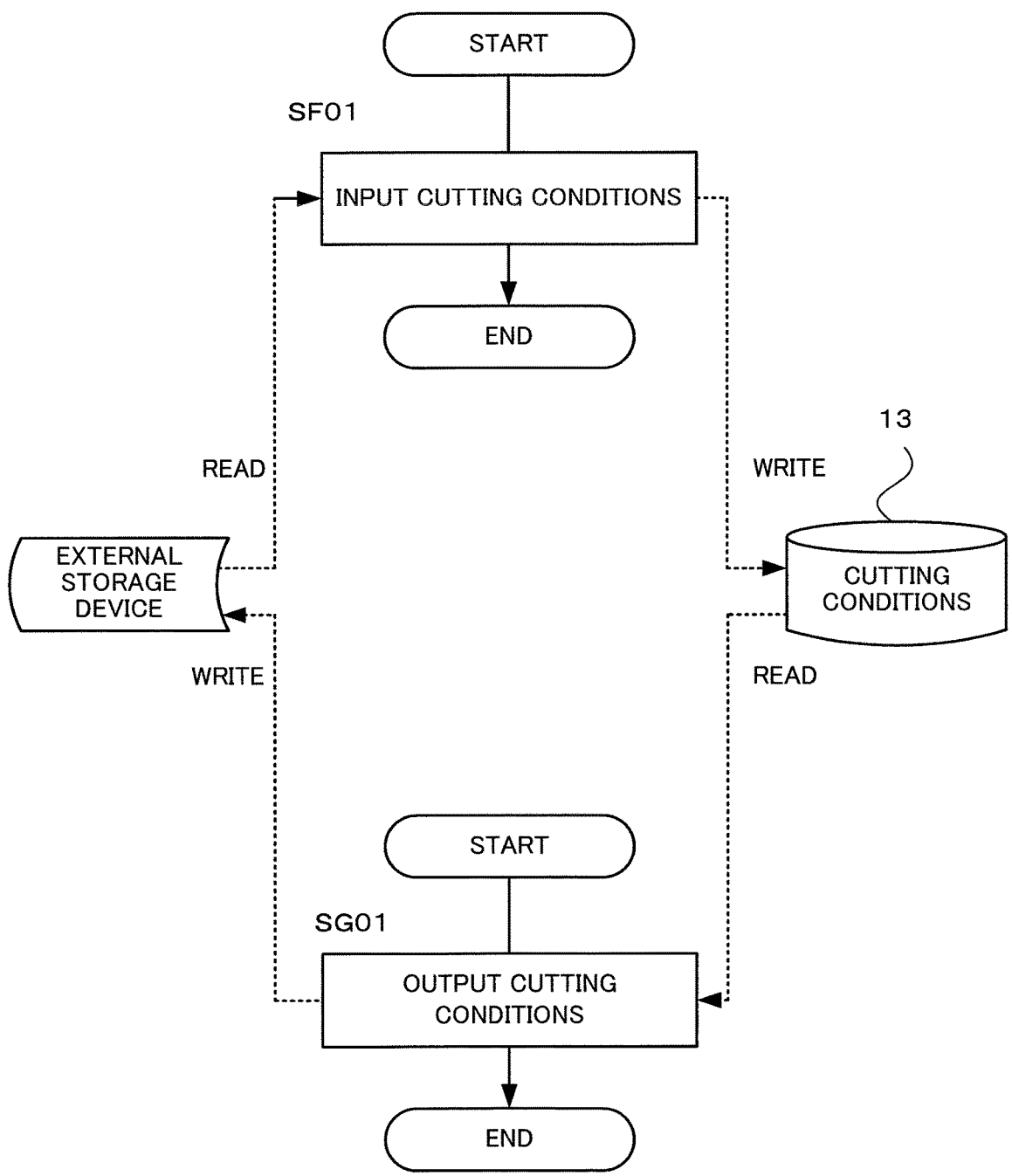
FIG. 17 is a diagram illustrating how cutting conditions stored in a cutting condition storage unit are allowed to be input and output.

The above cutting conditions are stored in the memory in the numerical controller. To enable comparison between these cutting conditions and those stored in the memory in a numerical controller for controlling another machine tool, the cutting condition display device may be given the functions shown in FIG. 17. These functions include reading the cutting conditions stored in the memory in the numerical controller, writing the read cutting conditions in a predetermined file format into an external storage device (Step SG01), and reading, in a predetermined file format, the cutting conditions stored in the external storage device and storing them in the memory (Step SF01).

The cutting condition display device described above is composed of the numerical controller for controlling the finishing machine. Alternatively, however, the cutting condition display device may be composed of a machining simulation device configured to simulate machining.

Figure 18:
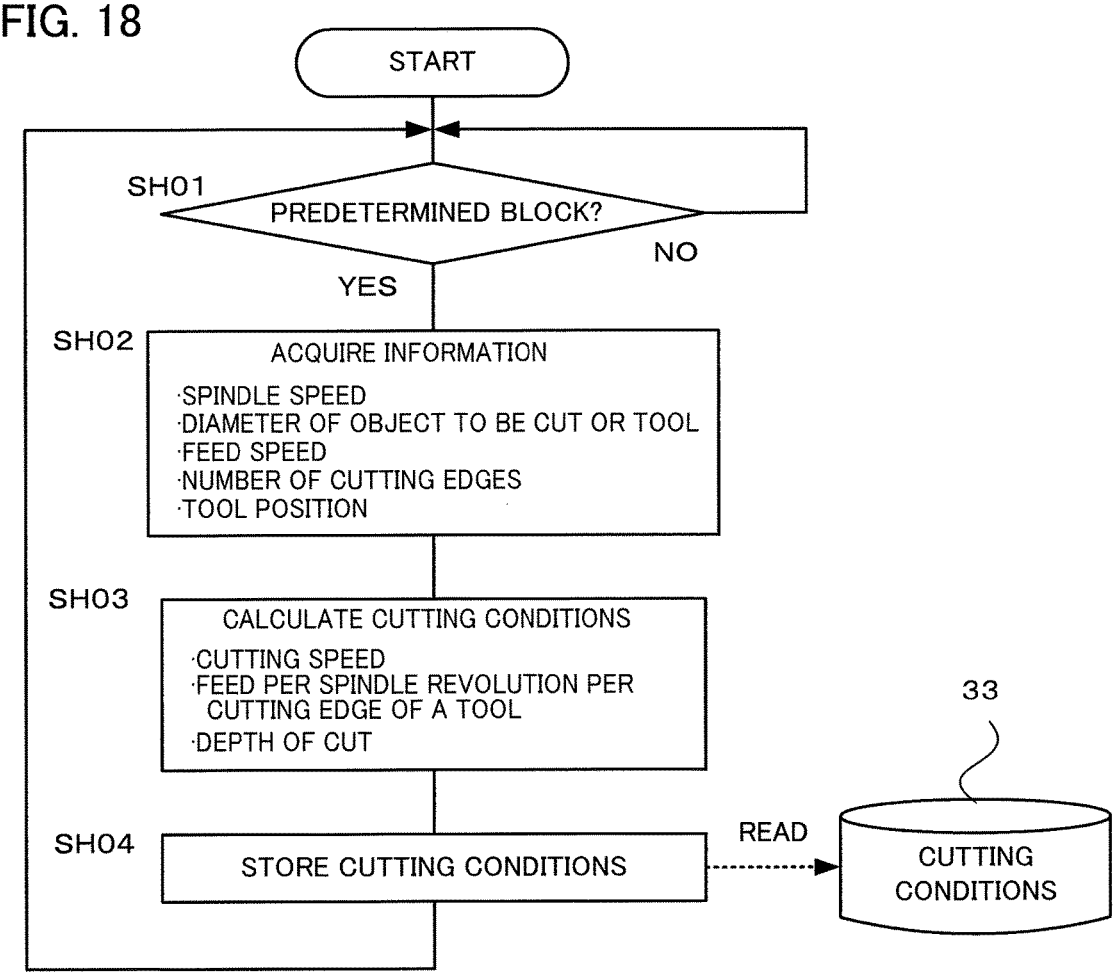
FIG. 18 is a flowchart of processing for obtaining the cutting conditions during the machining simulation.

FIG. 18 is a flowchart of processing for obtaining the cutting conditions during a machining simulation. The following is a sequential description of steps of this processing.

[Step SH01] It is determined whether or not the block in which the machining simulation is performed is a predetermined block (cutting block) in the machining program. If the block is the predetermined one (YES), the program proceeds to Step SH02.

[Step SH02] Information is acquired. The information to be acquired includes data, such as the spindle speed, diameter of the object to be cut or the tool, feed speed, number of cutting edges of the tool, and tool position. These data are provided for a conventional machining simulation device, and can be acquired from the machining simulation execution unit 31 of the machining simulation device 30 of FIG. 2.

[Step SH03] The cutting conditions are calculated based on the information acquired in Step SH02. The cutting conditions to be calculated include the cutting speed, feed per spindle revolution per cutting edge of a tool, and depth of cut.

[Step SH04] The cutting conditions calculated in Step SH03 are stored in the memory, whereupon the program returns to Step SH01.

The above flowchart will be additionally explained.

According to the above description, the program is configured to proceed to Step SH02 when the block in which the machining simulation is performed is determined to be the predetermined block (cutting block) in Step SH01. Alternatively, however, the program may be configured to proceed to Step SH02 when the passage of the fixed time is determined.

In Step SH02 described above, moreover, the information to be acquired includes the spindle speed, feed speed (relative to the object to be machined) of the tool, tool position, etc., which are data created by the machining simulation device during the machining simulation of the machining program. Further, the spindle speed is a command given to a spindle by the machining program, while the feed speed is a command for a movable axis. The diameter of the object to be cut and the number of cutting edges of the tool may be data previously stored in the machining simulation device or data to be commanded by the machining program.

Figure 19:
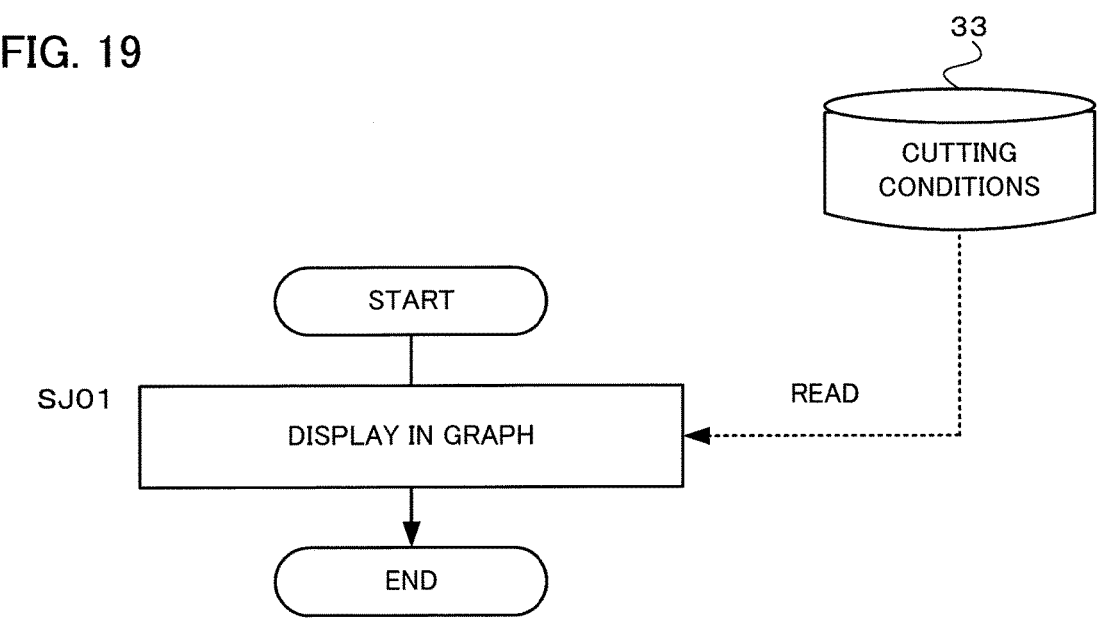
FIG. 19 is a flowchart of processing for graphically displaying the cutting conditions obtained by the machining simulation.

FIG. 19 is a flowchart of processing for graphically displaying the cutting conditions.

[Step SJ01] The cutting conditions are read from the memory 13 and graphically displayed on the display screen of the cutting condition display device, as shown in FIG. 4, for example. If the cutting condition display device is composed of the machining simulation device 30 (FIG. 2), the cutting conditions are graphically displayed on the display screen of the display/input unit 34.

The processing shown in the flowcharts of FIGS. 14 to 17 can be performed by means of (the cutting condition display device composed of) the machining simulation device 30 shown in FIG. 2, as well as by means of (the cutting condition display device composed of) the numerical controller shown in FIG. 1.

The invention claimed is:

1. A cutting condition display device, comprising:
a numerical controller configured to control at least one of a spindle and a movable axis of a finishing machine based on a machining program among a plurality of machining programs,
wherein the cutting condition display device is configured to display cutting conditions for the finishing machine, and comprises:
a cutting condition calculation unit configured to calculate at least one of cutting conditions including a cutting speed, a feed per spindle revolution per cutting edge of a tool, and a depth of cut for each fixed time or each predetermined block of each of the plurality of machining programs during an operation of the finishing machine, based on any or a combination of data on the spindle, the movable axis, said tool, and an object to be cut, which are held by the numerical controller;
a cutting condition storage unit configured to store, for each of the plurality of machining programs, the calculated at least one cutting condition for said tool during the operation of the finishing machine; and
a graphic display unit configured to graphically display the cutting conditions stored in the cutting condition storage unit during the operation of the finishing machine,
wherein
the plurality of machining programs includes a first machining program and a second machining program, the cutting conditions stored in the cutting condition storage unit include
  a first set of cutting conditions of the first machining program, the first set of cutting conditions indicating a first tool life for said tool, and
  a second set of cutting conditions of the second machining program, the second set of cutting conditions indicating a second tool life for said tool, the second tool life different from the first tool life, and
the graphic display unit is configured to simultaneously display the first and second sets of cutting conditions using graphically distinguishable first and second sets of indicators, respectively, to enable (i) comparison between the first tool life and the second tool life of the first and second machining programs, respectively, and (ii) based on the comparison, selection of a machining program among the plurality of machining programs for the operation of the finishing machine.

2. The cutting condition display device according to claim 1, further comprising;
a cutting condition acquisition unit configured to acquire at least one of cutting conditions including a spindle speed and a feed speed for each fixed time or each predetermined block of each of the plurality of machining programs, during the operation of the finishing machine, based on any of the data on the spindle and the movable axis,
wherein the cutting condition storage unit is configured to store, for said tool, the cutting condition acquired by the cutting condition acquisition unit.

3. A cutting condition display device, comprising:
a numerical controller configured to control at least one of a spindle and a movable axis based on a machining program among a plurality of machining programs; and
a machining simulation device configured to perform a machining simulation for the numerical controller,
wherein the cutting condition display device is configured to display cutting conditions for the machining simulation device, and comprises:
  a cutting condition calculation unit configured to calculate at least one of cutting conditions including a cutting speed, a feed per spindle revolution per cutting edge of a tool, and a depth of cut for each fixed time or each predetermined block of each of the plurality of machining programs during the machining simulation, based on any or a combination of a command given to the spindle by the machining program, a command given to the movable axis by the machining program, and data on said tool and an object to be cut;
  a cutting condition storage unit configured to store, for each of the plurality of machining programs, the calculated at least one cutting condition for said tool during the machining simulation; and
  a graphic display unit configured to graphically display the cutting conditions stored in the cutting condition storage unit during the machining simulation,
wherein
the plurality of machining programs includes a first machining program and a second machining program,
the cutting conditions stored in the cutting condition storage unit include
  a first set of cutting conditions of the first machining program, the first set of cutting conditions indicating a first tool life for said tool, and
  a second set of cutting conditions of the second machining program, the second set of cutting conditions indicating a second tool life for said tool, the second tool life different from the first tool life, and
the graphic display unit is configured to simultaneously display the first and second sets of cutting conditions using graphically distinguishable first and second sets of indicators, respectively, to enable (i) comparison between the first tool life and the second tool life of the first and second machining programs, respectively, and (ii) based on the comparison, selection of a machining program among the plurality of machining programs for the machining simulation.

4. The cutting condition display device according to claim 3, further comprising;
a cutting condition acquisition unit configured to acquire at least one of cutting conditions including a spindle speed and a feed speed for each fixed time or each predetermined block of each of the plurality of machining programs, during the machining simulation, based on the command given to the spindle or the command given to the movable axis,
wherein the cutting condition storage unit is configured to store, for said tool, the cutting condition acquired by the cutting condition acquisition unit.

5. The cutting condition display device according to claim 1, wherein
the graphic display unit is configured to display a graph created by plotting each of the first and second sets of cutting conditions on a coordinate system, wherein
  the coordinate system has coordinate axes representative of the cutting conditions in each of the first and second sets of cutting conditions, and
  values of the cutting conditions in each of the first and second sets of cutting conditions correspond to plotted points in the graph.

6. The cutting condition display device according to claim 5, further comprising:
a block number acquisition unit configured to acquire, for each of the plurality of machining programs, a block number when the at least one cutting condition is calculated by the cutting condition calculation unit,
wherein the cutting condition storage unit is configured to store the calculated at least one cutting condition in association with the corresponding machining program and the block number acquired by the block number acquisition unit, and
the graphic display unit is configured to further display the first or second machining program and a cursor, wherein
  when a point plotted on the graph is selected, the graphic display unit is configured to move the cursor on the displayed first or second machining program to the block stored in association with the at least one cutting condition corresponding to the selected plotted point.

7. The cutting condition display device according to claim 5, further comprising:
a block number acquisition unit configured to acquire, for each of the plurality of machining programs, a block number when the at least one cutting condition is calculated by the cutting condition calculation unit,
wherein the cutting condition storage unit is configured to store the calculated at least one cutting condition in association with the corresponding machining program and the block number acquired by the block number acquisition unit, and
the graphic display unit is configured to further display the first or second machining program, wherein when a point plotted on the graph is selected, the graphic display unit is configured to change, on the displayed first or second machining program, a display color or a background color of a block stored in association with the at least one cutting condition corresponding to the selected plotted point.

8. The cutting condition display device according to claim 5, further comprising:
   a block number acquisition unit configured to acquire, for each of the plurality of machining programs, a block number when the at least one cutting condition is calculated by the cutting condition calculation unit,
   wherein the cutting condition storage unit is configured to store the calculated at least one cutting condition in association with the corresponding machining program and the block number acquired by the block number acquisition unit, and
   the graphic display unit is configured to further display the machining program and the block number stored in association with the at least one cutting condition corresponding to each point plotted on the graph by the graphic display unit.

9. The cutting condition display device according to claim 1, wherein the cutting condition storage unit is configured to store the calculated at least one cutting condition when a calculated difference between the at least one cutting condition stored last time and the calculated at least one cutting condition is not less than a fixed value.

10. The cutting condition display device according to claim 1, further comprising;
    a block number comparison unit configured to compare the machining program and a block number for the at least one cutting condition stored last time with those for the calculated at least one cutting condition,
    wherein the cutting condition storage unit is configured to store the calculated at least one cutting condition when the machining programs and the block numbers compared by the block number comparison unit are different.

11. The cutting condition display device according to claim 5, wherein the graphic display unit is configured to
    further display the first or second machining program, and
    change a block of the first or second machining program displayed on the graphic display unit when one of the plotted points in the graph is selected.

12. A finishing machine configured to finish an object, the finishing machine comprising:
    a motor;
    a spindle driven by the motor;
    a movable axis;
    a cutting tool;
    a sensor configured to detect machining state data related to the cutting tool;
    a numerical control unit configured to control at least one of the spindle and the movable axis based on a machining program among a plurality of machining programs;
    a cutting condition display device configured to display a cutting condition for the numerical control unit, the cutting condition display device comprising:
      a cutting condition calculation unit configured to calculate at least one of cutting conditions including a cutting speed, a feed per spindle revolution per cutting edge of a tool, and a depth of cut for each fixed time or each predetermined block of each of the plurality of machining programs during an operation of the finishing machine, based on any or a combination of data on the spindle, the movable axis, said tool, and an object to be cut, which are held by the numerical controller;
      a cutting condition storage unit configured to store, for each of the plurality of machining programs, the calculated at least one cutting condition for said tool during the operation of the finishing machine; and
      a graphic display unit configured to graphically display the cutting conditions stored in the cutting condition storage unit during the operation of the finishing machine,
    wherein
    the plurality of machining programs includes a first machining program and a second machining program,
    the cutting conditions stored in the cutting condition storage unit include
      a first set of cutting conditions of the first machining program, the first set of cutting conditions indicating a first tool life for said tool, and
      a second set of cutting conditions of the second machining program, the second set of cutting conditions indicating a second tool life for said tool, the second tool life different from the first tool life, and
    the graphic display unit is configured to simultaneously display the first and second sets of cutting conditions using graphically distinguishable first and second sets of indicators, respectively, to enable (i) comparison between the first tool life and the second tool life of the first and second machining programs, respectively, and (ii) based on the comparison, selection of a machining program among the plurality of machining programs for the operation of the finishing machine.

* * * * *